3,686,010
PROCESS FOR THE MANUFACTURE OF TITANIUM DIOXIDE PIGMENT HAVING HIGH SPECIFIC RESISTANCE
Monroe M. Solomka, Bilbao, and José M. Genua Montoya, Algorta, Spain, assignors to Dow-Unquinesa S.A., Axpe, Bilbao, Spain
Filed Dec. 30, 1970, Ser. No. 102,835
Int. Cl. C09c 1/36
U.S. Cl. 106—300                                    10 Claims

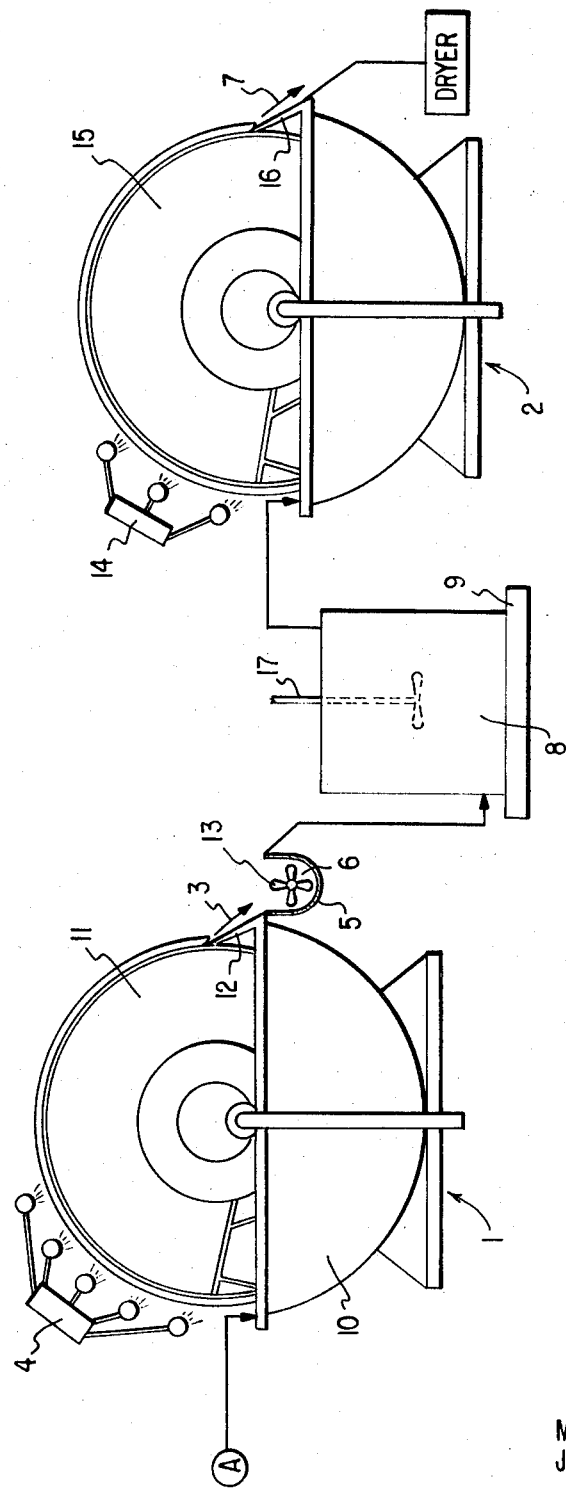

ABSTRACT OF THE DISCLOSURE

A titanium dioxide pigment having high specific resistance is prepared by forming a slurry of the pigment having a solids content of about 10–30% by weight in deionized or distilled water, heating the slurry between about 50° C. and its boiling point, for at least 15 minutes, and dewatering and drying the pigment.

BACKGROUND OF THE INVENTION

The industries which consume pigments and colors in general require them to have a minimum content of water soluble salts. In applications based on aqueous vehicles, the presence of water soluble salts may, in many cases, adversely affect the stability of the dispersion. Even in those cases where a certain degree of flocculation is desired, it is preferable first to obtain the pigment or color in a stable dispersed state and then to induce the desired flocculation, so that a uniform result is always obtained.

Pigments which are low in water soluble salt contents are also to be preferred in nonaqueous systems. Poor dispersibility, often related to the water soluble salt content of the pigment, will give rise to enamels of poor gloss, water-sensitive films, and the like.

The water soluble salt content of pigments may be determined by extraction with water, followed by evaporation of the aqueous extract and weighing of the solid residue. Another technique often employed for this determination is to prepare an aqueous slurry of the pigment and to measure the specific resistance of the slurry or the filtrate thereof. The specific resistance, or resistivity, which is the reciprocal of conductivity, is measured by the resistance of a body of a given substance one centimeter long and one square centimeter in cross section. The unit is indicated as the ohm-centimeter.

Thus, in a general and practical sense, high specific resistance can be associated with low water soluble salt content.

In the manufacture of titanium dioxide, as in the case of many other pigments and colors, prolonged washing of the finished pigment is necessary to assure a high specific resistance. In the case of titanium dioxide, the pigment customarily receives a treatment wherein the particles are coated with precipitated hydrous oxides such as alumina and silica. By their nature, these coatings adsorb cations and anions during their precipitation and in practice, these ions are only removed with difficulty. In some processes of manufacture, resort is had to prolonged washing with deionized water for this purpose. The addition of small quantities of barium hydroxide to the washed pigment has also been proposed to neutralize the remaining traces of sulfate ion. In practice, however, the exact dosification of $Ba(OH)_2$ has proven burdensome.

GENERAL DESCRIPTION OF THE INVENTION

In accordance with the present invention, it has been found that the specific resistance of a pigment can be greatly increased, in a simple and effective manner, without reverting to the conventional use of large quantities of deionized or distilled water or other types of high purity water for washing the pigment.

In accordance with the invention, a pigment having a high specific resistance is prepared by a method which comprises the steps of (a) forming a slurry of the pigment in good quality water, such as, for example, deionized or distilled water, the slurry having a solids content of about 10% to about 30% by weight, and (b) heating the slurry at a temperature of at least about 50° C., and maintaining the temperature between about 50° C. and the boiling point (about 100° C.), for a period of time sufficient to produce the desired specific resistance in the finished pigment. This heating period is generally at least about 15 minutes, and may range up to about 1 hour, but usually about 30 minutes will suffice. The heating temperature is critical, and is preferably about 80° C. in the case of most pigments, and particularly titanium dioxide pigments.

By "high" specific resistance there is meant a specific resistance of the pigment of at least aobut 14,000 ohm-centimeter.

Advantageously, the pigment, prior to pulping to form the aforementioned aqueous slurry, is first washed with a relatively small quantity of good quality water, such as deionized or distilled water. Such small quantity may range from about 2% to about 5% by weight of the pigment. The quality of the water itself may be indicated by its specific resistance, which is advantageously of the order of about 30,000 ohm-centimeter, and preferably not less than about 10,000 ohm-centimeter.

After heating, the pigment slurry is dewatered, for which purpose it may be filtered by any suitable means, the filter cake dried, and the pigment milled in accordance with conventional practice. A little wash water may also be applied during this filtration.

The process of the invention is applicable to pigments of all types, but particularly to titanium pigments, such as the rutile or the anatase forms of titanium dioxide.

The practice of the method of the invention will be better understood by reference to the accompanying drawing, which illustrates in schematic form a present preferred embodiment comprising an arrangement of filters and slurrying equipment whereby the treatment of the pigment may be performed in accordance with the invention.

In the embodiment shown in the drawing, the arrangement comprises a first filter 1, which may be, for example, a rotary filter of any suitable type, such as a vacuum drum rotary filter. Pigment in the form of an aqueous slurry of suspension is supplied to the tank 10 of the filter from a supply source A, and is picked up by revolving vacuum filter drum 11, being washed during its travel by water from spray means 4, and is discharged in the form of filter cake 3 by blowback or other conventional removal technique employed with this type of filter, into a repulping tank 5 fitted with agitator 13. In the repulping tank 5 the cake is repulped with deionized or distilled water 6, to a solids content suitable for subsequent feeding to a second or dewatering filter 2. Prior to feeding to second filter 2, the repulped pigment is heated to the desired temperature in tank 8, provided with heating means 9 and agitator 17. The filter 2 is provided with rotary vacuum drum 15 and removal blade 16, and washing means 14 for further washing of the pigment cake 7, which thence passes to a dryer.

In industrial practice, one way to achieve the benefits of the present invention, utilizing the arrangement illustrated in the drawing, is to filter a slurry or suspension of treated pigment, such as a treated rutile titanium dioxide pigment, on the first rotary filter, washing the filter cake 3 with hot water 4, the temperature of the water being in the range of at least about 35° to about 45° C., but the preferably being between about 60° and about 80° C. Owing to the design of a rotary filter, perfect washing cannot ordinarily be attained on one filter. Accordingly the cake 3, discharged by blowback or other techniques customarily employed with this type of filter, is transferred to a repulper where it is repulped with good quality deionized or distilled water 6 to a solids content suitable for feeding a second, or dewatering filter 2, which in turn forms the cake 7, which is subsequently dried. Normally the feed to the second filter should contain about 15% to about 20% solids by weight. If too dilute, pigment loss in the filtrate is excessive. Nevertheless, the present invention is equally effective at any solids concentration. In order to obtain the full benefits of the present invention, it is sufficient to heat the pigment, repulped in deionized or distilled water, as explained above, to a temperature of at least about 50° C., and preferably about 80° C., for at least about 15 minutes, and preferably at least about 30 minutes, before feeding the pulp to the dewatering filter. If desired, the filter cake formed on this filter may be further washed during filtration, or subsequent to filtration. However, washing on the second filter is performed in a more limited way than on the first filter, since the primary purpose of the final filter is to achieve a cake with a maximum solids content, so as to attain maximum economy in the drying step.

DESCRIPTION OF THE PREFERRED EMBODIMENTS

The following examples, which are not to be regarded as limiting, serve to illustrate the practice of the invention:

Example 1

This example illustrates the level of specific resistance attainable in a titanium dioxide pigment washed with water at room temperature in accordance with conventional practice. A treated rutile titanium dioxide pigment was repulped to 20% solids, filtered and washed with 6.5 parts by weight per part of pigment of water having a specific resistance of 30,000 ohm-centimeter. The water temperature was 20° C. The washed pigment was dried and milled and had a specific resistance of 4,000 ohm-cm.

Example 2

This example illustrates the effect of increasing the temperature of the wash water in accordance with the present invention. The pigment suspension employed in Example 1 was washed in exactly the same way, but with the variation that the temperature of the wash water was 80° C. The finished pigment had a specific resistance of 8,000 ohm-centimeter.

Example 3

This example illustrates the practice of the invention employing deionized water for repulping. As in Example 1, a titanium dioxide pigment slurry was filtered (on filter 1) but in this instance the filter cake was washed with only 3.5 parts of deionized water per one part of pigment, at 80° C., the water having a specific resistance of 30,000 ohm-centimeter. The filter cake was then repulped with 3 parts deionized water per one part of $TiO_2$. Thus, the total water employed was 6.5 parts per 1 part pigment, equal to that used for washing alone in Examples 1 and 2. The repulped pigment was heated to 50° C., agitated for 30 minutes at 50° C., and dewatered by filtration (filter 2) without a second washing. The recovered cake was dried and milled. The specific resistance of this pigment was 14,500 ohm-cm. demonstrating the advantages of the repulping and thermal treatment in accordance with the present invention.

Example 4

Example 3 was repeated, except that the termal treatment of the repulped pigment was performed at 80° C. for 30 minutes. The pigment thus obtained had a specific resistance of 18,500 ohm-centimeter.

Example 5

Example 3 was repeated in all details except that the washed cake was repulped to 20% solids by weight and the thermal treatment was performed for 30 minutes at the boiling point. The finished pigment had a specific resistance of 18,000 ohm-centimeter.

What is claimed is:

1. Method for the preparation of a titanium dioxide pigment having a high specific electrical resistance consisting essentially of the following steps:
    (a) forming a slurry consisting essentially of from about 10% to about 30% by weight of said pigment and deionized or distilled water;
    (b) heating said slurry to a temperature of at least about 50° C. and maintaining the slurry at a temperature between about 50° C. and the boiling point of the slurry for a period of time sufficient to produce the desired specific resistance in the finished pigment; and
    (c) dewatering the pigment and drying to obtain the finished pigment.

2. The method of claim 1 in which the pigment is rutile titanium dioxide.

3. The method of claim 1 in which the pigment being treated is coated with at least one hydrous oxide.

4. The method of claim 1 in which the time of heating is about 30 minutes.

5. The method of claim 1 in which the pigment is washed with a small quantity of deionized or distilled water prior to the slurry formation in step (a).

6. Method for the preparation of a titanium dioxide pigment having a high specific electrical resistance consisting essentially of the following steps:
    (a) feeding an aqueous slurry of a titanium dioxide pigment to a first filter and filtering thereon to form a dewatered filter cake;
    (b) repulping said filter cake in a medium consisting essentailly of deionized or distilled water to form an aqueous suspension having a solids concentration between about 10% and about 30% by weight;
    (c) heating said repulped pigment suspension to a temperature of at least about 50° C. and maintaining said suspension at a temperature between about 50° C. and the boiling point of the suspension for a period of time sufficient to produce the desired specific resistance in the finished pigment;
    (d) filtering said suspension on a second filter to recover a second dewatered filter cake; and
    (e) drying to obtain the finished pigment.

7. The method of claim 6 in which the pigment being treated is rutile titanium dioxide coated with at least one hydrous oxide.

8. The method of claim 6 in which the pigment being treated treated is anatase titanium dioxide coated with at least one hydrous oxide.

9. The method of claim 6 in which the filter cake is washed with deionized or distilled water during filtration step (a).

10. The method of claim 6 in which the filter cake is washed with deionized or distilled water during filtration step (d).

References Cited

UNITED STATES PATENTS

| | | | |
|---|---|---|---|
| 2,216,536 | 10/1940 | Madson et al. | 106—300 |
| 3,203,818 | 8/1965 | Rechmann et al. | 106—300 |
| 3,573,945 | 4/1971 | Lott et al. | 106—300 |

TOBIAS E. LEVOW, Primary Examiner

J. V. HOWARD, Assistant Examiner

U.S. Cl. X.R.

106—309

UNITED STATES PATENT OFFICE
CERTIFICATE OF CORRECTION

Patent No. 3,686,010          Dated August 22, 1972

Inventor(s) Monroe M. Solomka and Jose M. Genua Montoya

It is certified that error appears in the above-identified patent and that said Letters Patent are hereby corrected as shown below:

In the heading of the patent insert: Claims Priority, Spain, application No. 375,246 filed January 8, 1970.

Claim 8, line 2, (column 4, line 55) delete "treated" (second occurrence).

Signed and sealed this 26th day of December 1972.

(SEAL)
Attest:

EDWARD M.FLETCHER,JR.          ROBERT GOTTSCHALK
Attesting Officer          Commissioner of Patents